June 6, 1972   SEINOSUKE HORIKI   3,667,988
MASKING IN SURFACE TREATMENT OF ARTICLES
Filed June 30, 1970

INVENTOR
SEINOSUKE HORIKI
BY *Stevens, Davis, Miller & Mosher*
ATTORNEYS

United States Patent Office 3,667,988
Patented June 6, 1972

3,667,988
MASKING IN SURFACE TREATMENT OF ARTICLES
Seinosuke Horiki, Nagoya-shi, Japan, assignor to Nagoya Yukagaku-Kogyo Kabushiki Kaisha, Takai-shi, Aichi-ken, Japan
Filed June 30, 1970, Ser. No. 51,141
Claims priority, application Japan, July 9, 1969, 44/54,378; May 25, 1970, 45/44,692
Int. Cl. B44d 1/02, 1/52
U.S. Cl. 117—38    6 Claims

ABSTRACT OF THE DISCLOSURE

A method of masking for protecting a specified area of surface of articles from coating or plating characterized in that protecting elements made of synthetic resin foam in the shape of a column, doughnut, ball, truncated cylinder, prism, cube, cap or ring are used and wherein said synthetic resin foam is stable and restrains elasticity at normal temperature, but when heated above a predetermined temperature rapidly contracts in its volume, thereby said area being effectively masked during coating or plating and during heat-treatment of the coated or plated article the protecting element is contracted in volume and freely removed from the article.

The present invention relates to a method for masking in surface treatments such as coating or metal plating of articles, in order to temporarily protect surfaces of recessions, hollows or other partial areas of the surface of the article which are desired to be left out from coating or plating.

In order to leave a part or parts of the surface uncoated or unplated in surface treatment such as coating or plating of the surface of an object, usually a protective film such as paper tape, synthetic resin film or the like has been used. However, in case the areas to be protected are the recessions or hollows, conventional protective films such as paper tape and the like are not satisfactory because the masking operation is difficult and complicated and it is also hardly possible to obtain the desirable effective masking.

Up to now for this purpose, a rubber plug having a configuration suited to stop up such recessions or hollows has usually been used. For example, in electrophoretic coating of a lower front suspension arm of an automobile, the inner surfaces of bush holes thereof, where intrusion of coating material is undesirable, have been masked by inserting rubber plugs into the holes. According to such method, however, when the coated or plated article is heated after surface finishing, rubber would be rapidly aged or deteriorated due to heat, and to invite bad adherence between the holes and the plugs, resulting in fall-out of the plugs in the course of the coating process or plating process, or intrusion of the coating material into the inner surface walls of the holes. Thus any satisfactory results could not be accomplished. Furthermore such rubber plug would be wasted after only at most 10 repeated uses, so that the cost of the masking operation is quite high. Further, rubber plugs must be removed from the holes piece by piece by hand after treatment has been completed. Thus such a method has disadvantages and in this respect is troublesome.

The object of the present invention is therefore to provide an improved masking method which has no disadvantages above described and which allows perfect and easy achievement of desired masking for the surfaces of recessions or holes or other specified areas of the articles to be surface treated.

The object of the present invention has been accomplished by a method of the present invention which comprises masking the recessions, holes or other surface areas of the article which are desired to be left out from coating or plating in surface treatment of an article, by means of closely fitting or covering such area with a protective element made of synthetic resin foam which is stable and elastic at normal temperature but rapidly contracts when heated above a certain predetermined temperature.

The synthetic resin foam to be used in the present invention as protective elements may be of any kind of thermoplastic resin foam, provided that it has such characteristics that it retains sufficient elasticity without any contraction at normal temperature but is rapidly contracted in volume when heated above a certain predetermined temperature, for example about 90° C. Suitable synthetic resin foams include porous polystyrene resin, porous polyethylene resin, polypropylene foam, acrylic polymer resin foams and vinyl resin foams, including vinyl homopolymers or copolymers and the like.

I have studied contracting properties of various kinds of polymer foams, and data is shown in the following table:

| Kind of polymer | Foaming magnification | Contracting temperature, ° C. | Deforming temperature, ° C. |
|---|---|---|---|
| Polystyrene | 40–60 | 95–120 | 65–90 |
| Polyethylene | 20–40 | 105–130 | 40–50 |
| Polypropylene | 20–40 | 110–140 | 60–75 |
| Methacrylic resin | 20–40 | 110–140 | 70–90 |

The term "contracting temperature" refers to the temperature at which contracting begins, and that is usually considerably higher than the deforming temperature of the polymer, but lower than the baking temperature of conventional coating materials.

Further, the larger foaming magnification is, the lower contracting temperature becomes. For instance, a porous polystyrene foam having a foaming magnification of 80 will contract more easily, and will start contraction at a temperature of about 90° C.

It should be noted, however, the protective elements used in the present invention shall not be affected with any mediums or ingredients of the coating composition and the plating bath to be used, since such protective elements must be maintained in situ during the surface treatment process.

This kind of polymer foam should be selected depending on the coating composition and the plating bath to be used. For example, in static deposition of melamine resin, alkyd resin and acryl resin, polystyrene foam is not suitable, because such resin will be dissolved with ester, ketone or aromatic hydrocarbon solvents of the coating materials. For such surface treatment, then, porous polyethylene foam is not suitable as the protective element. On the other hand for electrodeposition of water soluble alkyd resin coating compositions such as described in the U.S. Pat. 3,230,162, patented on Jan. 18, 1966 and assigned to Ford Motor Company, porous polystyrene will be most effective and will give most excellent results.

The protective elements according to the present invention are easily applied to the surface of articles before the surface treatment such as coating or electroplating by pushing into the recessions or hollows or onto a specified area of the surface of the article.

As the results of the above studies, resin foams listed in the above table are found to be preferable in the present invention.

According to the present invention, not only any recessions or hollows of articles can be protected from the coating and plating, but also any surface such as the screwed end surface of bolts or circumferential surface of bars or pipes can be protected.

For protection of recessions or hollows, protective elements of the synthetic resin foam in any columnar, doughnut, ball, truncated cylinder, prism, cube or like shape, depending to the shape of recessions or hollows of the article to be protected, are preferably used. The size of such elements should preferably be such that their sectional contours are slightly larger than those of the recessions or hollows, so that the elements may be forcedly inserted into the recessions or hollows to achieve close fitting and thereby maintained in close contact with the surfaces of recessions or hollows during the coating or plating process.

For protection of the screwed end surface of bolts or partial circumferential surface of bars or pipes, the protective elements in the shape of a cap or ring, having at least one radial notch of at least three quarter depth from the circumferential surface of the cap or the ring, are used.

Such foam cap or ring should preferably have an inner diameter of slightly smaller than the diameter of the bar or pipe in order to achieve close fitting between the bar or pipe and the foam cap or the ring.

In the practice of the method of the present invention the recessions, holes or specified areas of the article to be protected from coating or plating are filled up or covered with the protecting elements of the above described present invention, and then the article is treated with conventional coating compositions or electroplated. I observed that during such surface treatment, any surfaces contacted with the foam have been completely protected from coating or plating, and at subsequent heating of the article to a temperature of heat-treating of the coated article, said protective elements have been contracted to small size of about one tenth volume of their original volume without any bonding to the surface of the article, thereby freely removed them without any trouble such as experienced with rubber plugs.

With a cap or ring of the present invention, during heat treatment of the coated or plated article said cap or ring contracts rapidly to a small size, and at the same time is broken off at the point of the notch, the contracted foam being thereby freely removed from the article.

The surface to be protected from coating or plating may be previously coated with any suitable release agent such as machine oil, silicone oil or the like, which helps the release or separating of the contracted foam from the article.

Thus, according to the present invention, the designated recessions or holes in an article to be surface-treated are surely protected from surface treatment such as coating or plating by dovetailed fitting therein of the protective elements made of synthetic foam resin, and in the ensuing heating step, said protective elements are rapidly contracted in volume to spontaneously fall from said recessions or holes, so that there is no need of taking the trouble to manually remove said elements as required in the conventional masking methods using rubber plugs. An additional prominent advantage of the present invention is that the masking can be performed at low cost since synthetic foam resin used in the present invention is available at extremely low cost.

This invention will be more fully described with preferable examples referring to the drawings.

EXAMPLE 1

Figure 1:
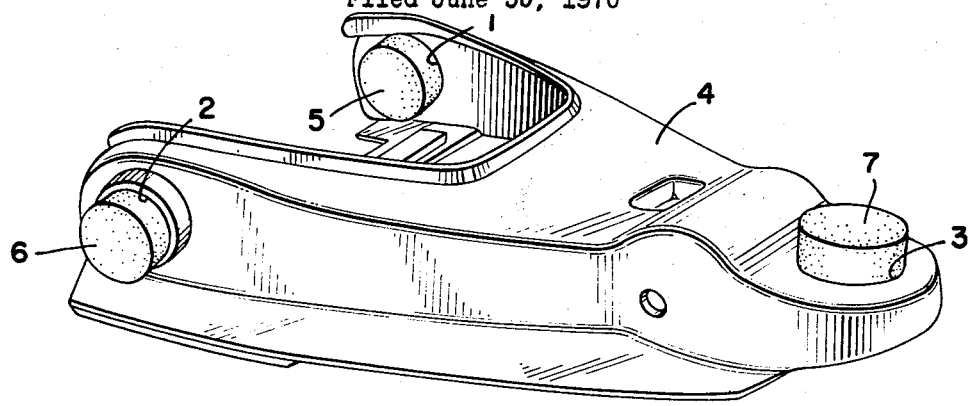
FIG. 1 is a perspective view of a lower arm in the front suspension of a car fitted with plugs of synthetic resin foam according to the present invention.
Figure 2:
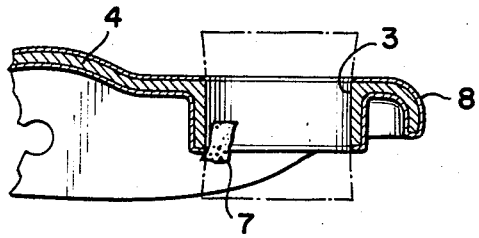
FIG. 2 is a sectional view of a part of the lower arm of FIG. 1, but after heat treatment, in which the contracted and released foam is shown.

This example illustrates an embodiment of the present invention carried out with a lower arm in the front suspension of a car as shown in FIGS. 1 and 2.

The lower arm 4 is made of steel plate and has three circular holes 1, 2 and 3, each having a diameter of from 26 mm. to 40 mm. In each of the circular holes 1, 2 and 3 is forcedly inserted columnar protective elements 5, 6 and 7 made of polystyrene foam with 50% foaming magnification, wherein each columnar protective element has a diameter about 0.5 mm. to 2 mm. larger than the diameter of said circular holes so that said protective elements are closely fitted in each hole.

Then this lower arm was immersed in a water soluble alkyd resin coating material bath and electro-deposited by means of a conventional electrophoretic technique to form a coated layer 8 on the uncovered surface. Then the electro-deposited article was placed in a hot blast drying furnace to heat it at 190° C. for 60 minutes to bake the coating on said article. During this heating, the protective elements were rapidly contracted and fell spontaneously from the holes, and the surfaces of the circular holes, with which the protective elements were in contact during the process, remained in an uncoated condition as shown in FIG. 2.

EXAMPLE 2

Figure 3:
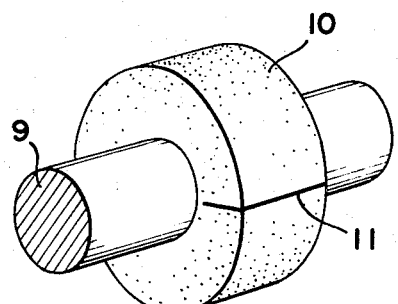
FIG. 3 is a perspective view of a bar fitted with a ring protective element according to the present invention.

A steel rod 9 having a diameter of 15 mm. is treated in a ring 10 made of methacrylic resin foam having a foaming magnification of 35, which has inner diameter of 14 mm. and outer diameter of 30 mm. and further a notch 11 of 12 mm. depth from the surface thereof as shown in FIG. 3.

Figure 4:
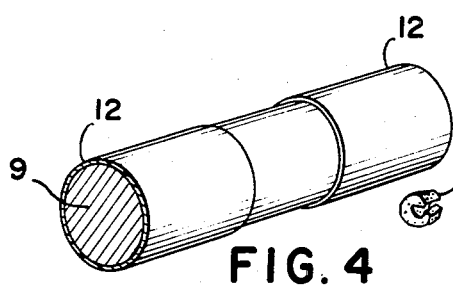
FIG. 4 is similar view of the same bar after heat-treatment in which the contracted foam is shown.

The steel rod with the ring 10 is coated with a paint 12 by means of static deposition and then baked at a temperature of 180° C. for 30 minutes. During this heating the protective ring was broken off at the point of the notch 11 and rapidly contracted into about one tenth the volume of original one and fell off the rod. In this case the surface protected with the foam ring remained clear without any coating material as shown in FIG. 4.

EXAMPLE 3

Figure 5:
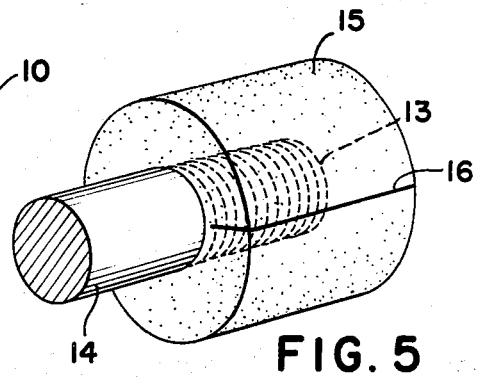
FIG. 5 is a perspective view of a part of bolt fitted with a cap according to the present invention.
Figure 6:
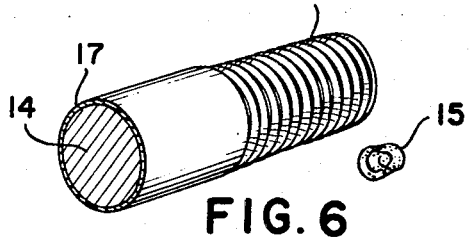
FIG. 6 is similar view of the same bolt after heat-treatment, in which the contracted foam is shown.

As shown in FIG. 5, the screwed end 13 of a bolt 14 having a diameter of 10 mm. was capped with a cap 15 of polyethylene foam having foaming magnification of 35, wherein said cap has a hollow of 9 mm. diameter and a notch 16 of 7 mm. depth.

This bolt capped with the cap was electroplated with chromium 17. The electroplated bolt was heated to a temperature of about 160° C. During this heating the protective cap was broken out at the point of the notch and rapidly contracted and fell off the bolt. Thus the screwed end of the bolt remained without any electro-deposition.

It will be understood that the above description is only illustrative of this invention and not in limitation thereof.

We claim:

1. A process for masking at least a portion of an article during a surface treating process comprising masking a specified area of the surface of an article which is to remain free from surface treatment with a masking element comprising a heat shrinkable synthetic resin foam, surface treating at least the unmasked portions of said article, and after surface treating said article heating the heat shrinkable masking element shrinking said element into an easily removable shape.

2. A process according to claim 1, wherein the masking element is in the shape of a cap and has at least one radial notch therein, the article to be surface treated is cylindrical, and the cap-shaped element is applied to said cylindrical article.

3. A process according to claim 1, wherein the masking element is in the shape of a ring and has at least one radial notch therein, the article to be surface treated is cylindrical, and the ring-shaped element is applied to said cylindrical article.

4. A process according to claim 1, in which the masking element is made of a thermoplastic synthetic resin foam having a foaming magnification range from 20 to 60.

5. A process according to claim 1, in which the masking element comprises a synthetic resin foam selected from the group consisting of polystyrene, polyethylene, polypropylene, acrylic polymer and vinyl resin foams.

6. A process according to claim 1, in which the masking element is forcedly inserted into hollows of the article to be surface treated.

References Cited

UNITED STATES PATENTS

| 2,758,947 | 8/1956 | Feighner | 117—38 X |
| 2,840,039 | 6/1958 | Darnell et al. | 118—505 |
| 2,401,415 | 6/1946 | Duggan | 118—504 X |

FOREIGN PATENTS

| 891,182 | 3/1962 | Great Britain | 264—317 |

ALFRED L. LEAVITT, Primary Examiner

K. P. GLYNN, Assistant Examiner

U.S. Cl. X.R.

117—48, 94, 95; 118—504, 505